(12) United States Patent
Everitt et al.

(10) Patent No.: US 8,418,569 B2
(45) Date of Patent: Apr. 16, 2013

(54) VARIABLE TORQUE-RATE TEST JOINT

(75) Inventors: Peter William Everitt, Leicestershire (GB); Ben William Tyers, Cambridge (GB); Andrew Chapman, Peterborough (GB); John Edward Burton, Birmingham (GB)

(73) Assignee: Crane Electronics, Ltd.

( * ) Notice: Subject to any disclaimer, the term of this patent is extended or adjusted under 35 U.S.C. 154(b) by 452 days.

(21) Appl. No.: 12/449,570

(22) PCT Filed: Apr. 11, 2008

(86) PCT No.: PCT/GB2008/001277
§ 371 (c)(1),
(2), (4) Date: Feb. 23, 2010

(87) PCT Pub. No.: WO2008/099204
PCT Pub. Date: Aug. 21, 2008

(65) Prior Publication Data
US 2010/0132481 A1    Jun. 3, 2010

(51) Int. Cl.
*G01L 5/24* (2006.01)
(52) U.S. Cl.
USPC ...................................................... 73/862.21
(58) Field of Classification Search .. 73/862.21–862.23, 73/1.11; 702/43
See application file for complete search history.

(56) References Cited

U.S. PATENT DOCUMENTS

| | | | |
|---|---|---|---|
| 2,503,649 A | 4/1950 | Zimmerman, Sylvia | |
| 3,329,058 A | 7/1967 | Deans Cumming, James | |
| 3,815,413 A | 6/1974 | Marshall et al. | |
| 4,150,559 A | 4/1979 | Levy | |
| 4,303,001 A | 12/1981 | Trungold | |
| 4,636,120 A | 1/1987 | Brandsberg | |
| 5,967,724 A | 10/1999 | Terry | |
| 6,202,028 B1 * | 3/2001 | Crane et al. | 702/43 |
| 6,609,407 B1 * | 8/2003 | Tambini | 73/1.11 |
| 7,640,785 B2 * | 1/2010 | Johnson | 73/1.12 |

FOREIGN PATENT DOCUMENTS

| | | |
|---|---|---|
| GB | EP0150964 A2 | 8/1985 |
| GB | 2438874 A | 12/2007 |
| JP | 60060525 | 4/1985 |
| JP | 110094662 | 4/1999 |
| JP | 2006010543 | 1/2006 |
| WO | WO 98/10260 | 3/1998 |
| WO | WO 2005/059496 | 6/2005 |

\* cited by examiner

*Primary Examiner* — Harshad R Patel
*Assistant Examiner* — Octavia Davis-Hollington
(74) *Attorney, Agent, or Firm* — Rebecca J. Brandau

(57) ABSTRACT

A variable torque-rate test point for the performance testing of rotary tools for threaded fasteners comprises a screw-threaded bolt (1) having a moment of inertia comparable to that of a bolt to be tightened using the rotary tool. The bolt (1) is tightened in the test joint against a torque-rate adjustment device (6) which can be adjusted to simulate a hard or a soft joint. The adjustment device (6) comprises a washer portion (7) beneath the bolt head (4), at least one spring beam (8) extending from a reaction point (9) radially outwardly of the bolt (1), and a pivotal bearing member (10) or other pivot at a mid portion of the beam (8). The beam (8) flexes as it extends in cantilever over the pivot point, and that flexure can be adjusted to vary the torque-rate of the test joint by varying the distance between the pivot point and the rotary axis of the bolt (1).

23 Claims, 7 Drawing Sheets

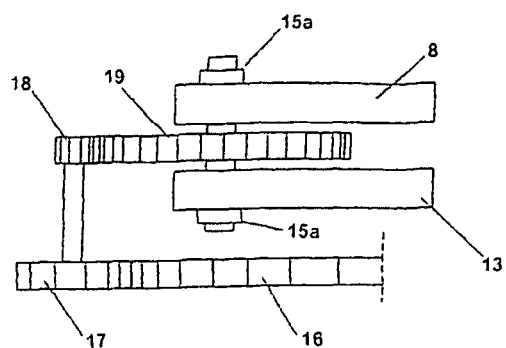
FIG.6
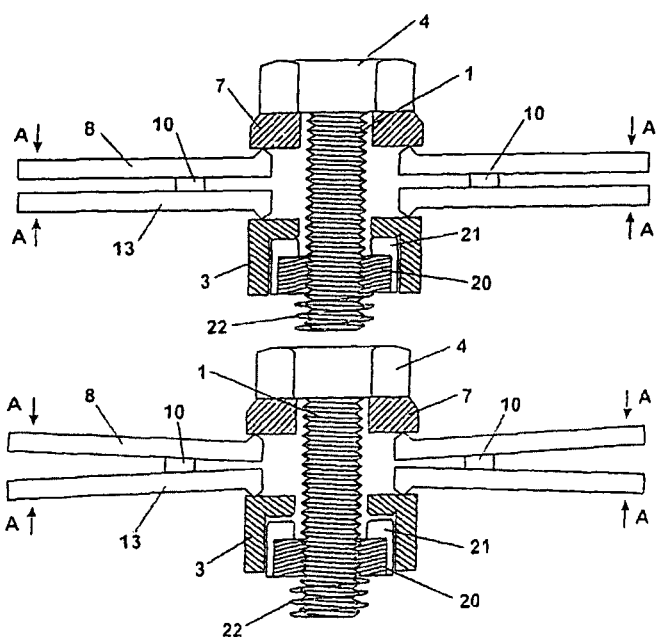
FIG.7
FIG.8

VARIABLE TORQUE-RATE TEST JOINT

CROSS-REFERENCES TO RELATED APPLICATIONS

This application claims priority to PCT/GB2008/001277 filed Apr. 11, 2008.

FIELD OF THE INVENTION

The invention relates to test joints for the performance testing of rotary tools for threaded fasteners. The invention provides such a test joint with a variable torque-rate.

BACKGROUND ART

The bolted joint is a very important fastener method in modern engineering assemblies. It works by screwing together two or more parts with a bolt and nut. The bolt or nut may be made integral with one of those parts, and the screwing action draws the bolt and nut together so that their faces produce a clamping force. During clamping the bolt material can stretch or the material forming the parts being fastened together may compress, as the nut is tightened. It is very difficult to measure the precise extent of the above stretching or compression, and therefore to deduce the resulting clamping force. Experiments are therefore performed with force washers to arrive at a torque value which is easy to measure, so as to establish that the clamping force is between specified limits. Once that torque value has been established, it may be replicated as a reliable means of creating a bolted joint with known characteristics, but to replicate reliably the amount of torque imparted during tightening of the joint, it becomes essential that the rotary fasteners used to tighten up the joints are also periodically checked, to make sure they are set up correctly before they are used on an assembly line.

International standards have been set up to specify performance test routines for checking the calibration of rotary tools which are used on assembly lines before fastening bolts and similar threaded fasteners. These performance test methods use Joint Rate Simulators (JRSs). These JRSs simulate the torque pattern that is experienced as a joint is tightened. To a first approximation, as a typical joint is tightened, the torque increases linearly with the angle turned by the screw thread. A JRS uses this characteristic to provide a test piece on which the tool will fit, such that when the tool applies torque to turn the test piece, that torque increases with the angle through which the bolt turns.

The rate of increase of torque with increasing angle is referred to as the torque-rate. A joint with a high torque-rate is referred to as a "hard joint", and full tightening is generally accomplished in a fraction of a revolution. In contrast, in a low torque-rate joint (known as a "soft joint") the full tightening is usually accomplished over a much greater angular range of movement, possibly several complete several revolutions of fastener.

Test joints are known in which a rotatable shaft is physically braked, with the braking effort increasing as a function of rotation. The braking effort, which can be achieved either by brake shoes engaging the outer cylindrical surface of the shaft or by brake pads engaging opposite surfaces of a brake disc carried by the shaft, can be varied to simulate either a hard or a soft joint. Our own WO98/10260 is an example of such a variable rate JRS. It allows the test joint parameters to be easily changed, allowing any test joint to be simulated; and it allows the torque to be removed after the joint has been tightened, so that a subsequent cycle of the performance testing routine can take place without any time delay. Any complete performance testing routine comprises a number of repeated tightening cycles of the test joint, with the results being averaged or statistically analyzed. This and other prior JRSs do not, however, have a moment of inertia that is matched to that of the real joint which they are simulating. The moment of inertia of the JRS is invariably greater than, and frequently vastly greater than, that of the real joint.

The disparity between the moment of inertia of the JRS and that of the real joint which it simulates increases when the mechanism for braking the test joint involves calliper brake pads braking against opposite sides of a brake disc. Disparities between the moment of inertia of the test joint and the moment of inertia of the real joint become particularly important when the test joint is used for the performance testing of impulse drive tools. These tools rely on the transfer of pulses of torque, each pulse being a few milliseconds in duration, with many pulses per second being applied to the joint. If the joint has a large moment of inertia, then the tool cannot transfer enough energy to make the joint initially free-turn before the joint tightens, and the tool can then stall. All JRSs with disc brakes suffer from this specific problem, and even JRSs with drum brakes clamping against opposite sides of a shaft can have moments of inertia that are not matched to that of the real joint under simulation, and so will not necessarily give true results for impulse tools.

It is an object of the invention to provide a variable torque-rate test joint which has a working moment of inertia that is more closely matched to that of a screw-threaded bolt which it simulates. That compliance between the moment of inertia of the JRS and that of the joint under simulation is achieved by using, for the rotary component of the JRS to be driven by the rotary tool, a screw threaded bolt, the size and inertia of which can be accurately matched with that of the bolt of the joint under simulation.

A disadvantage of known JRSs is that they have a control system which affects the real time torque. When a real bolt is turned by a pulse tool, every time it is not moving, the torque is not increasing and may even be relaxing, yet when the bolt starts to turn under the influence of the impulse, the torque starts to increase immediately. On the other hand in a JRS, when the bolt starts to move with an impulse, this movement must be sensed by an angle encoder which informs a brake controller, which then reacts by increasing the brake pressure so as to simulate the torque increasing. This whole control system takes a finite time so there can be a time lag in the way the simulated test joint of the JRS responds to the tool. It is a further object of the invention to avoid this problem.

Another disadvantage of existing JRSs is that energy is expended in operating the brake while the test joint is being operated by, the tool. It is highly desirable that, once the test joint parameters have been set up, no further energy should be expended by the JRS during the test run. This can be achieved by having the key parts mechanical and not reliant on an energy source for their operation. Even the set-up may be manual as opposed to requiring a power source. Therefore in such a JRS there would be no need to carry around large heavy batteries, which require re-charging to operate the devices. That means it would be possible to have a desktop version that was hand operated for setup purposes and has no other energy requirements.

THE INVENTION

The invention provides a variable torque-rate test joint for the performance testing of rotary tools for threaded fasteners, as defined in claim 1 herein.

In the test joint of the invention, the screw threaded bolt should be matched in size and moment of inertia with that of the joint under simulation, and the torque-rate of the test joint is controlled entirely by the torque-rate adjustment device that is positioned between the head of the bolt and a shoulder adjacent the screw threaded aperture. The amount of movement of the washer portion of the adjustment device, from the instant in which the bolt head first comes into contact with the washer portion to the maximum torque/maximum angular displacement position, is easily and reproducibly varied by varying the radial distance between the or each pivot point and the central rotary axis of the bolt. When that distance is long, the length of spring extending in cantilever over the pivotal bearing member is also long and the potential range of flexure of the spring beam is more than when the pivotal bearing member is closer to the central rotary axis of the bolt. The former simulates a soft joint, and the latter simulates a hard joint. The hardness or softness of the simulated joint can be easily calculated from known constants such as the inherent elasticity and dimensions of the or each spring beam, or can be plotted empirically as a function of the distance between the or each pivotal bearing member and the central rotary axis of the bolt.

A variable torque-rate test joint according to the invention can be designed to be suitable for a range of torques and a range of joint rates. To be suitable for the performance testing of the full range of rotary tools in current commercial use, however, it is contemplated that sets of three or more separate variable torque-rate test joints according to the invention would be provided. In a set of three, a low range test joint would be suitable for torques in the range of 1 to 50 Nm. A medium range test joint could be produced, suitable for a torque-range of 50 to 200 Nm. A higher range test joint could be produced, suitable for a torque-range of 200 to 500 Nm. Across that range of test joints according to the invention, one could performance test a range of rotary tools capable of delivering torques between 1 and 500 Nm. Each test joint would preferably be adjustable between joint rates of 27° to 720°. The different test joints in the above set of three could acquire their different torque capacities by being made from different steels or materials with similar properties. For example, the low and mid range systems (1 to 50 Nm and 50 to 200 Nm respectively) may require 420 Mpa steel, whereas the higher range (200 to 500 Nm) systems may require a slightly stronger steel at 520 Mpa. In a set of five variable torque-rate test joints according to the invention, the five ranges could be 1 to 25 Nm; 25 to 50 Nm; 50 to 100 Nm; 100 to 180 Nm and 180 to 500 Nm.

The most appropriate means of providing an adjustably positioned pivot point over which the or each spring beam extends in cantilever is to provide a pivotal bearing member over which the spring beam extends. However it is possible that a curved spring beam could rest at a convex portion along its curvature, so that the pivot point is created by contact between that convex portion and the test rig. In such a case the means for varying the distance between the pivot point and the rotary axis of the bolt most conveniently comprises means for moving the reaction point in a direction parallel to the bolt axis. As the relative distance between the spring beam 8 at its anchorage end and the test rig is adjusted, there is a corresponding change in the reaction point and in its spacing from the bolt axis. For ease of comprehension, however, elsewhere in this description the adjustable pivot point and the adjustably positioned pivotal bearing member will be collectively referred to as a pivotal bearing member, unless the sense demands otherwise.

According to a first aspect of the invention, the or each spring beam extends radially outwardly from the central rotary axis of the screw-threaded bolt. In such a test joint if there is a single spring beam in the torque-rate adjustment device, then that spring beam sits on the washer portion of the torque-rate adjustment device encircling the bolt beneath the bolt head in a reaction zone radially offset from the axis of the screw-threaded bolt. That is not an ideal arrangement, because it creates an asymmetric bias on the bolt head as the bolt is tightened. If according to the first aspect of the invention the torque-rate adjustment device comprises more than one spring beam extending radially outwardly from the bolt to the reaction point, then preferably that array of radial spring beams is arranged symmetrically around the central bolt, so that the reaction from the spring beams through the washer portion onto the head of the bolt is symmetrical around the bolt axis. Thus it will generally be preferable to have two or more such beams, preferably three such beams, arranged symmetrically around the bolt.

According to a second aspect of the invention, a single specially designed spring beam is used in the torque-rate adjustment device. That spring beam has a single flexible beam portion extending over the pivotal bearing member to the reaction point at the beam end remote from the screw-threaded bolt. At the end of the beam proximal to the screw-threaded bolt, however, the beam is preferably bifurcated, extending in two symmetrical arms which surround or partially surround the screw-threaded bolt, and contact the washer portion of the torque-rate adjustment device at reaction zones that are on diametrically opposite sides of the bolt axis, those two reaction zones being along a line perpendicular to the central longitudinal axis of the radially extending spring beam portion. In that way the invention contemplates a radially extending spring beam which exerts an axially symmetrical bias on the washer portion of the torque-rate adjustment device, imparting no asymmetric forces on the screw-threaded bolt during tightening.

According to a third and final aspect of the invention, the torque-rate adjustment device comprises a parallel side by side pair of spring beams which extend tangentially from beneath the bolt head, over aligned pivot points, and to aligned reaction points. If the spring beams have matched spring constants, are parallel to one another, and have contact points with the washer portion that encircles the bolt beneath the bolt head at positions equidistant from the bolt axis, then it is very much easier to be able to vary the distance between each pivot point and the central rotary axis of the bolt than if the spring beams were in a non-parallel configuration. For example, the pivot points for the two spring beams may consist of a single pivot member movable, preferably under computer control, towards or away from the rotary axis of the screw-threaded bolt. Moving that one pivot member while maintaining it accurately perpendicular to the two parallel spring beams is sufficient to ensure that the reaction of the spring beams against the washer portion of the adjustment device encircling the bolt beneath the bolt head acts symmetrically on opposite sides of the bolt axis, thus avoiding any undesirable twisting of the bolt in use.

The or each spring beam should support in cantilever the washer portion of the adjustable device. For adjusting the variable torque-rate of the test joint in multiple beam systems, the means for varying the distances between the associated pivot points and the central rotary axis of the bolt are preferably effective to vary those distances only in unison with one another. That unitary movement is of course inherent in the second and third aspects of the invention as described above. For the first aspect of the invention, the means for varying the distance may for example comprise screw means or cam means. Screw means would be most suitable for a torque-rate adjustment device with two spring beams diametrically opposed one on each side of the screw threaded bolt. Equal and opposite screw threads at opposite ends of such screw means could mean that rotation of the screw means causes the pivotal bearing members to move for equal distances on opposite sides of the bolt axis. Cam means may be a more appropriate mechanism for moving three or more pivotal bearing members in unison one with the other.

The screw threaded recess in the test rig may be a screw threaded recess in a solid work table, in which case the reaction point of the or each spring beam is preferably an anchorage to that work table. Alternatively the or each spring beam can be provided with an associated reaction beam (which may itself be a spring beam) extending generally parallel to the spring beam and supporting at a mid-portion thereof the associated pivotal bearing member. In those circumstances the reaction point of the or each spring beam is an anchorage to the associated reaction beam, and the or each reaction beam takes purchase, at its end nearest to the screw threaded bolt, from the shoulder adjacent the screw threaded aperture. Typically that could be the shoulder of a nut carried on the screw threaded bolt of the test joint.

It is highly desirable that the test joint of the invention should incorporate means for rapidly releasing the torque imparted to the screw threaded bolt at the end of each torque tightening cycle of a performance test. If the torque is not rapidly released in this way, then each torque tightening cycle of the performance test must be followed by reversal of the torque drive to the screw threaded bolt, so that the bolt is unwound back to its starting position ready for the next cycle of the performance test. Not all the rotary tools are capable of going into instant torque reversal mode, and a rapid release of torque at the end of each torque tightening cycle of the performance test would enable a rapid and possibly even automatic run-back of the bolt, using procedures that will be described in further detail below.

One possible means for rapidly releasing the torque imparted to the screw threaded bolt at the end of each torque fastening cycle of a performance test comprises means for axially moving the shoulder relative to the bolt head, temporarily to release the compression applied to the torque-rate adjustment device at the end of each torque tightening cycle of the performance test. Alternatively, instead of axially moving the shoulder there may be provided means for axially moving the reaction point of the or each spring beam. That may for example be by the use of a cam member, although preferably if there are multiple spring beams and therefore multiple reaction points, movement of a single cam member to a pressure releasing position should cause axial movement of all reaction points simultaneously. Such movement can release the spring pressure applied by the spring beam or spring beams on the washer portion, thereby enabling rapid run-back of the bolt to its starting position. That run-back can be achieved automatically, by means for mechanically running the threaded bolt back to its start position for a subsequent torque tightening cycle of a performance test, while the torque imparted to the threaded bolt is released at the end of each cycle. A lightweight torque spring, for example, may be provided, preferably wrapped around the threaded bolt and with its ends acting upon the threaded bolt and upon the test rig respectively, so that as soon as the torque imparted to the threaded bolt is released at the end of each cycle, the spring runs the bolt back to its starting position. The torque characteristic of such a spring can be constant or substantially constant over the angular range of bolt movement in the performance test, and that constant value can readily be allowed for in the control circuitry, discussed below, which evaluates the performance of the rotary tool under test.

Instead of a lightweight torque spring to run the threaded bolt back at the end of each cycle, an electric motor may be provided, driving a rotary spindle engageable with an end of the threaded bolt remote from the bolt head, to engage and turn the threaded bolt at the end of each cycle while the torque imparted to the bolt during the cycle is released.

According to a preferred embodiment of the invention a number of variable torque-rate test joints according to the second or third aspect of the invention are provided in a fixed array, with one pivotal bearing member common to all of the spring beams, mounted on guides which maintain it accurately perpendicular to the spring beams, and moved under computer control by a single electric motor. That motor may be, for example, a stepper motor, and the bearings on which the pivotal bearing member is mounted are preferably such that the pivotal bearing member is maintained accurately in line with the array of variable torque-rate test joints over the whole of its range of movement. The movement of the pivotal bearing member may be monitored by a linear voltage displacement transducer, and the output from that transducer used in a feedback loop to the stepper motor to establish accurate and consistent movement of the pivotal bearing member for all test runs.

DRAWINGS

FIG. 6 is a schematic plan view of the release mechanism of FIGS. 4 and 5;

FIG. 7 is a schematic section similar to that of FIG. 1 but illustrating a torque spring return mechanism for use between successive cycles of a performance test;

FIG. 8 is the same section as that of FIG. 7, but with the torque released for the automatic run-back;

Figures 13, 14:
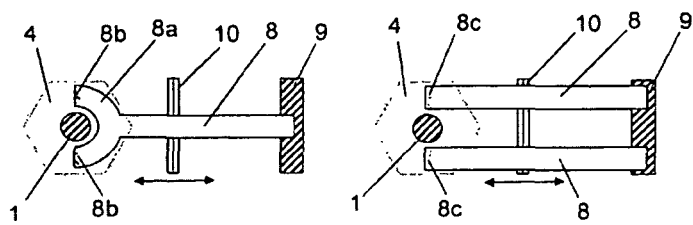
Figure 15:
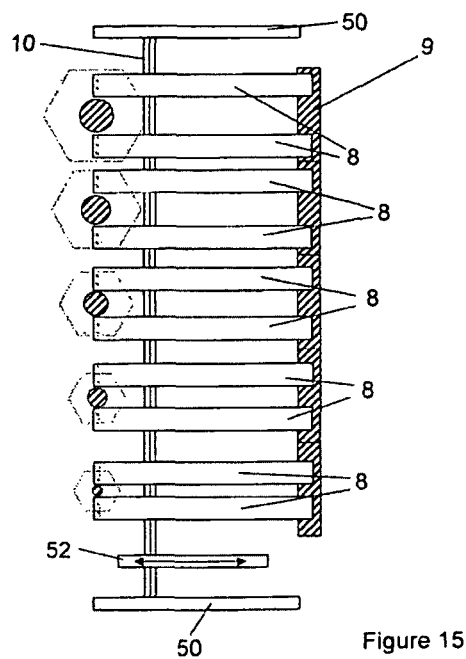

FIG. 13 is a plan view from above of a variable torque-rate test joint according to the second aspect of the invention, with certain components omitted for clarity. In FIG. 13 the washer portion of the torque-rate adjustment device is omitted in its entirety; the stem of the screw-threaded bolt is shown cross-hatched as if in section; and the hexagonal head of the bolt is shown dotted. Finally the means for varying the distance between the single pivot point and the central rotary axis of the bolt is shown simply as a double-headed arrow;

FIG. 14 is a plan view from above similar to that of FIG. 13, but through a variable torque-rate test joint according to the third aspect of the invention; and FIG. 15 is a plan view from above similar to that of FIG. 14, through an array of five variable torque-rate test joints according to the third aspect of the invention, showing five different bolt sizes.

Figure 1:
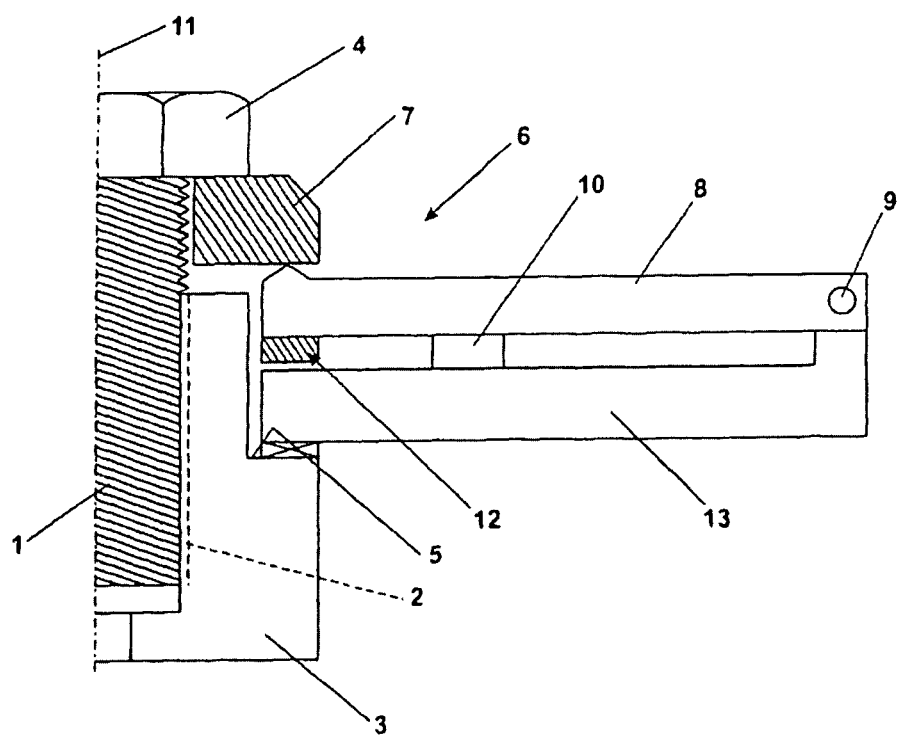
FIG. 1 is an axial section through a variable torque-rate test joint according to the first aspect of the invention, the section showing schematically the torque-rate adjustment device on one side only of a central axis of the screw-threaded bolt.

Referring first to FIG. 1, the test joint comprises a headed bolt 1, screw-threadedly received in a threaded bore 2 in a test rig 3. The bolt 1 is a conventional bolt of the size and pitch, and therefore the same moment of inertia, as one that would be used in a production line assembly process, and is the only rotational component of the test joint of the invention so that the test joint automatically has the same moment of inertia as the joint which it simulates.

Between the head 4 of the bolt and a shoulder 5 of the test rig is a torque-rate adjustment device indicated generally as 6. The torque-rate adjustment device comprises a washer portion 7 encircling the bolt 1 beneath the bolt head 4, and one or more radially extending spring beams 8 extending from a reaction point 9 which is located radially outwardly of the bolt. The or each spring beam 8 extends radially inwardly from its reaction point 9, over a pivotal bearing member 10, to support in cantilever the washer portion 7. The shape, surface finish or material of the washer portion 7 can be varied to affect the under-head friction as sensed by the bolt head 4.

Although not illustrated in FIG. 1, which is purely schematic, means are provided for varying the distance between the pivotal bearing member 10 and a central rotary axis 11 of the bolt, to vary the spring constant exerted by the spring beam 8 on the bolt head and thus to vary the effective torque-rate of the test joint.

Although only one spring beam 8 is shown in FIG. 1, it will be understood that a number of such radially extending spring beams could be provided, preferably arranged symmetrically around the bolt, each being precisely as illustrated in FIG. 1 to support in cantilever the washer portion 7 of the adjustable device 6. If more than one spring beam 8 is provided, then the means for varying the distance between the different pivotal bearing members 10 and the axis of the bolt 11 are preferably effective to vary those distances only in unison with one another.

The test joint of FIG. 1 is used for the performance testing of rotary tools for threaded fasteners according to conventional procedures. A torque and angle measurement device, such as that sold under the trade mark CHECKSTAR, is placed over the head 4 of the bolt 1, and is driven by the drive head of the rotary tool under performance test. That rotary tool may be a torque wrench or nutrunner, and may be manually or power actuated. If power actuated, then it could be electrically or pneumatically driven, continuously or pulsatingly as an impact wrench. As the bolt 1 is tightened, the torque and angle measurement device sends a stream of torque-rate information to a central store such as the memory of a computer, and from that information the correct calibration of the rotary tool can be tested under true performance conditions. The performance testing algorithms are conventional and are discussed for example in relation to impulse tools in our WO98/10260. The significant features of the test joint of the invention are that the moment of inertia of the rotary components are reduced to simply the moment of inertia of the headed bolt 1 so as to match as closely as possible the moment of inertia of bolts that would be assembled using the rotary tool on an assembly line. Also, the torque-rate adjustment device 6 provides a convenient, inexpensive and highly accurate method of varying the torque-rate of the simulated joint under test, that variation ranging from a very hard joint which can go from initial engagement to maximum torque over a very small angle of rotation to a very soft joint which goes from initial engagement to maximum torque only after one or two complete revolutions of the bolt head 4. The range of torque-rates (expressed in Newton metres per revolution) achievable by the test joint of the invention is extremely high. Only one adjustment is needed to vary the torque-rate, namely the distance between the pivotal bearing members 10 and the central axis 11 of the bolt 1, although to extend the overall range of torque-rates and maximum torque capacities available it will normally be preferred to have a number of different sized test joints according to the invention, each one adjustable over a given range of torque-rates and maximum torque capacities, with each range extending the total adjustability of the test joints in the series, to provide a complete spectrum of maximum torque capacities and torque-rates. For each individual test joint, however, the torque-rate can be calculated for each location of the pivotal bearing member 10 relative to the bolt 1, that calculation making use of the known spring constant characteristics of the spring beam 8 used in each test joint.

It will be appreciated, simply from an overall assessment of FIG. 1, that moving the pivotal bearing member 10 up close to the left hand end of the spring beam 8 creates virtually constant metal-to-metal compression when the bolt is tightened (simulating a hard joint), whereas moving the pivotal bearing member 10 to the right allows for a much greater range of progressive compression of the adjustment device 6 as the bolt is tightened (simulating a soft joint).

FIG. 1 also illustrates an optional stop member 12 which would be a solid metal shoulder on the spring beam 8, intended to prevent over-flexure of the spring beam 8 if the joint were to be over-tightened. As shown in FIG. 1, the stop member 12 is a solid metal member affixed beneath the spring beam 8. It will of course be understood that the same result cold be obtained from a stop member secured over the test rig 3 or from an integral stepped portion of the test rig 3 engaging the under-side of the spring beam 8 to prevent over-flexure; or from a stop member supported beneath the washer 7 but shaped so as to avoid contact with the spring beam 8 but to come into abutment with the test rig 3 to limit the flexure of the spring beam when the joint is over-tightened. The latter stop member may have additional advantages, for example in assisting the location of the washer 7 relative to the test rig 3 if the bolt were removed for maintenance.

Figure 2:
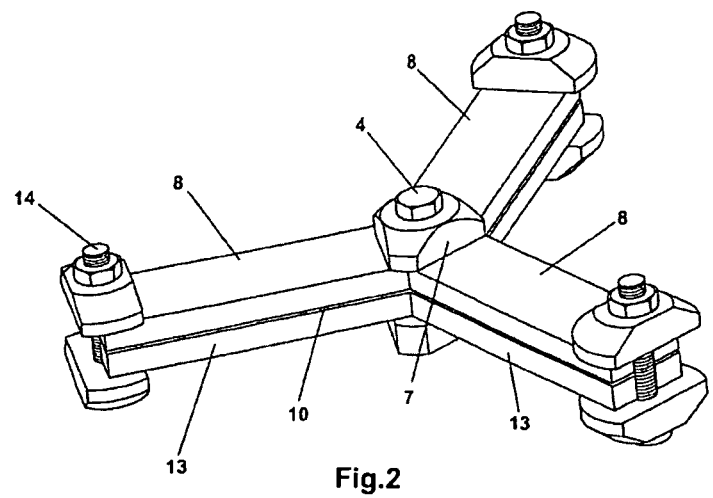
FIG. 2 is a perspective view of one embodiment of a joint according to the first aspect of the invention.
Figure 3:
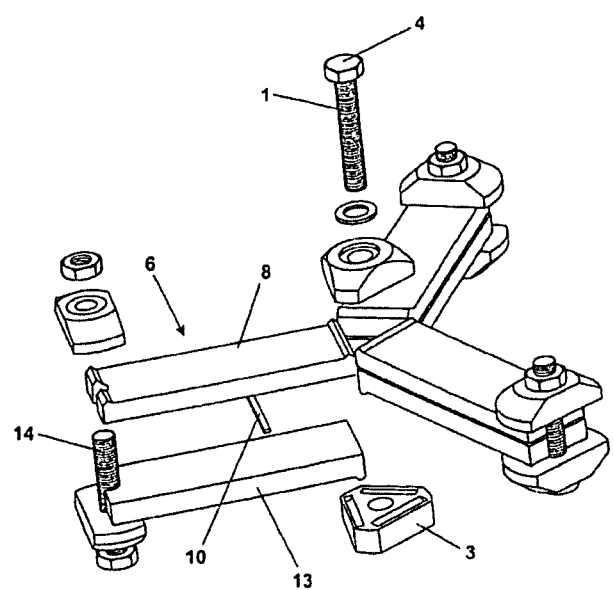
FIG. 3 is a perspective view of the components of the test joint of FIG. 2, but in a partially exploded condition.

The reaction point 9 in FIG. 1 is shown as a pivot, according to which the spring beam 8 is anchored to a bottom plate 13 but is permitted to flex about the pivotal bearing member 10. The bottom plate 13 may be a work table of the test rig formed integrally with the portion of the rig 3 indicated in FIG. 1, or may be formed separately from the rig 3. Instead of a complete work table, the bottom plate 13 may be a reaction beam extending generally parallel to the spring beam 8, as illustrated in FIGS. 2 and 3. That reaction beam may itself be a spring beam.

In FIGS. 2 and 3, another embodiment of the invention is illustrated, although the same reference numerals have been used for parts of the same function, so that repetition of the full detailed description is unnecessary. In FIG. 3 there are three separate spring beams 8, spaced apart symmetrically around the bolt 1. Each spring beam 8 lies directly over a reaction beam 13, and in place of the pivotal anchorage 9 of FIG. 1, the ends of the spring beams 8 remote from the bolt 1 are anchored to the reaction beams 13 by bolts 14. In the embodiment of FIGS. 2 and 3 there would be, in addition, a mechanism for varying the distance between each pivotal bearing member 10 and the central rotary axis of the bolt, but no such mechanism is illustrated in FIGS. 2 and 3 and a better understanding of the adjustment mechanisms possible will be apparent later in this Specification.

Figure 4:
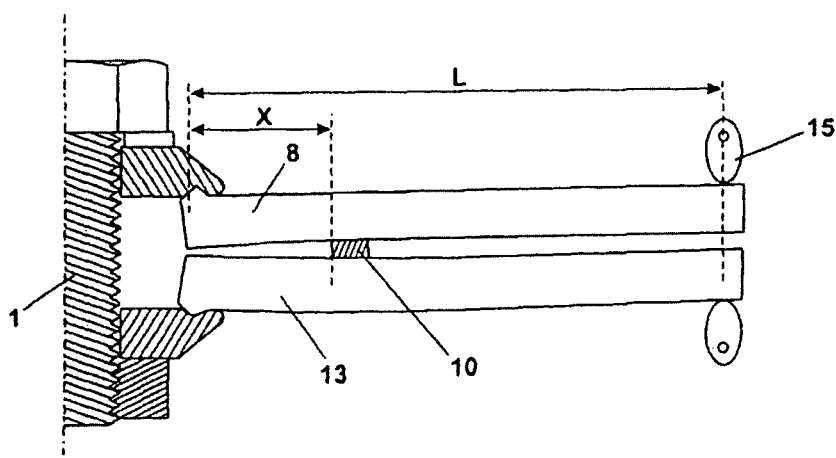
FIG. 4 is a sectional view, similar to that of FIG. 1, of another variable torque-rate test joint according to the first aspect of the invention, which has means for the automatic release of torque at the end of each cycle of a performance test.
Figure 5:
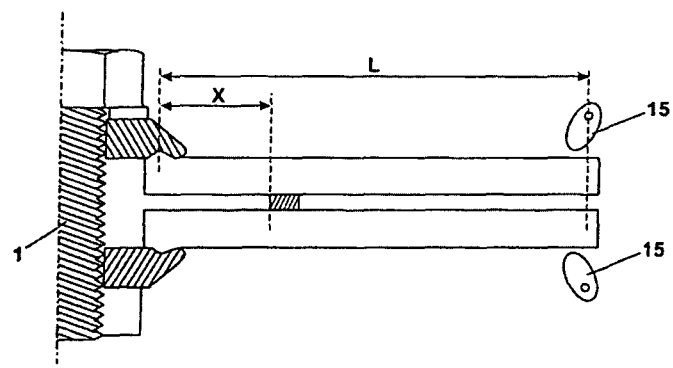
FIG. 5 is a section similar to that of FIG. 4 but with the reaction point ends of the spring beam released, to release torque.

FIGS. 4 and 5 illustrate a test joint constructed generally as described above with reference to FIGS. 1 to 3, but with additional means for rapidly releasing the torque imparted to the screw threaded bolt at the end of each torque tightening cycle of a performance test. Once again, the illustration is largely schematic but it will be seen that in a test joint having the general geometry of that of FIG. 1 or of FIGS. 2 and 3, the anchorage point 9 of FIG. 1 or the anchorage bolts 14 of FIGS. 2 and 3 are replaced by a pair of cams 15. The cams are movable in unison from the position shown in FIG. 4 to that shown in FIG. 5. FIG. 4 shows the test joint in its fully tightened condition, with the spring beam 8 and the reaction beam 13 being flexed around the pivotal bearing member 10 by the application of full torque to the bolt 1. That fully tightened condition could be achieved within a fraction of a second during each torque application cycle of the performance testing routine of a rotary tool. At the end of that torque tightening cycle the bolt 1 would have to be returned to its initial position, for the next torque tightening cycle. Every performance testing sequence includes a number of such torque application cycles, so that the rotary tool's performance can be evaluated against the mean of a number of such tightening procedures. Reverse movement of the bolt 1 from the fully tightened condition of FIG. 4 would be difficult, and may be impossible when using some rotary tools. To facilitate that reverse movement, the cams 15 are rotated to the positions shown in FIG. 5, which releases all compression from the simulated joint, enabling the bolt 1 to be run back easily or even mechanically.

FIG. 6 illustrates very schematically how a series of intermeshing gears 16, 17, 18 and 19 could be used to draw together a pair of abutments or anchorage points 15a as an alternative to using rotary cams 15.

FIGS. 7 and 8 illustrate one possible method of automatically returning the bolt 1 to its start position at the end of each torque application cycle of the test procedure. The anchorage points 9, 15 or 15a of the previous embodiments have been omitted from FIGS. 7 and 8 but will be understood to act generally along the lines of the arrows A. In FIG. 7 the bolt 1 is shown as being fully tightened, and in FIG. 8 the compression is released by removal of the anchorage points as in FIG. 5. In each of FIGS. 7 and 8 it will be seen that the bolt 1 engages a nut 20 over the top of which is a splined cap 21 which engages with radial splines in the bottom of the rig member 3. A torsion spring 22, illustrated schematically, imparts a torsional bias to the bolt 1 in the unwinding direction. As the test joint is tightened during the torque application phase of each cycle of the performance test, rotation of the bolt 1 is against the bias of the torsion spring 22. When the compression is released as in FIG. 8, there is sufficient force in the torsion spring 22 to return the bolt 1 to its original position, so that the anchorage points of the outer ends of the spring beam 8 can be re-established, and the next torque application phase of the test routine can be commenced immediately.

Instead of using a torsion spring 22 for the automatic running back of the bolt 1 to its original position, it would be possible to use an electric motor, preferably one which, when actuated, moves a driver head into engagement with a driving formation formed at the bottom end of the bolt 1 so that the bolt can then be returned, preferably under numerical control, to its starting position. This would typically require from 3 to 5 revolutions at most.

Figure 9:
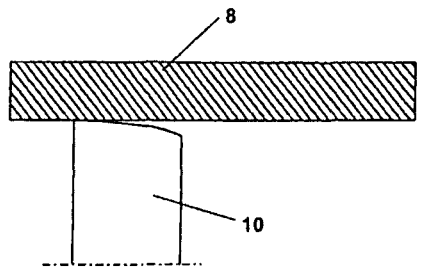
FIG. 9 is an enlarged detail of one possible shape for a pivotal bearing member of a torque-rate adjustment device to be used in the test joint according to the invention.

FIG. 9 illustrates an optimised shape of the pivotal bearing member 10. This shape provides that when the spring beam 8 bends, its area of contact with the pivotal bearing member 10 increases, thus resisting yielding. The curve illustrated in FIG. 9 is exaggerated for clarity. The maximum angle would be only about 2.4° for a test joint suitable for a lower range of maximum torque capacities (for example, from 1 to 50 Nm), down to about 0.32° for the highest range (200 to 500 Nm).

Figure 10:
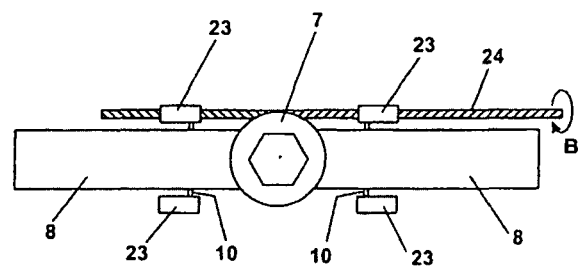
FIG. 10 is a schematic plan view of one means for varying the distance between a pair of pivotal bearing members and a central rotary axis of the bolt in a test joint according to the invention.
Figure 11:
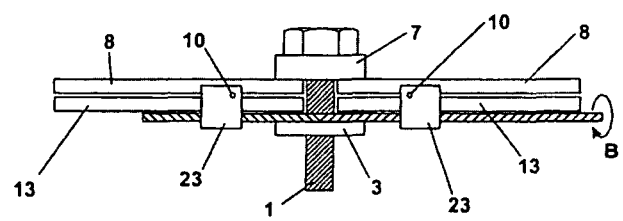
FIG. 11 is a schematic side elevation of the distance varying mechanism of FIG. 10.

In the previous description no specific illustration has been given of the means for varying the distance between a number of pivotal bearing members 10 which are moved in unison relative to the central bolt axis 11. Any mechanical means for the simultaneous movement of the pivotal bearing members 10 can be used. The simplest illustration is of a test joint comprising a pair of spring beams 8 and a pair of pivotal bearing members 10, and is illustrated in FIGS. 10 and 11. Each pivotal bearing member 10 is supported at its ends in a bearing block 23, and the bearing blocks 23 would be suitably formed that they were constrained to move in a path parallel to the central longitudinal axis of the respective spring beam 8. One pair of such bearing blocks 23 would be linked by a double threaded screw shaft 24 which has oppositely inclined screw threads, of identical pitch, at its ends. There would be means (not shown) for preventing longitudinal movement of the shaft 24, so that rotational movement thereof, as illustrated by the arrow B, would cause simultaneous movement of the bearing blocks 23 and of the pivotal bearing members 10 which they carry, towards or away from the central axis of the bolt 1. It will readily be understood how numerical control of the rotation of the shaft 24, under computer control, can position the pivotal bearing members 10 at precise pre-calculated positions to produce the required torque-rate for the test joint to match the particular circumstances of the performance test. If more than two spring beams 8 were provided, for example three spring beams 8 as in FIGS. 2 and 3, then the simultaneous adjustment could be by means of three lead screws 24 acting in unison, or by a three-jaw chuck arrangement.

Figure 12:
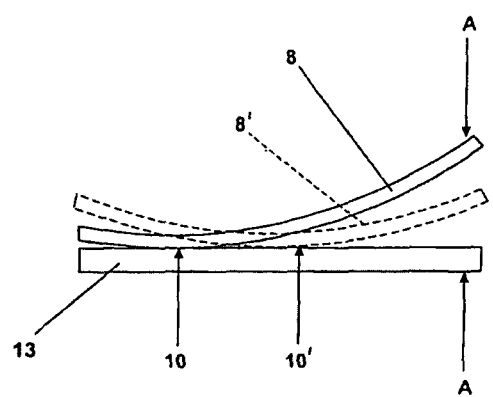
FIG. 12 is a schematic illustration of how a convex curved spring beam can use its contact with a reaction beam to create its pivot point; and how the distance between that pivot point and the rotary bolt axis can be adjusted by changing the height of the reaction point relative to the reaction beam.

FIG. 12 illustrated how a curved convex spring beam 8 may simply rest on the bottom plate 13 in order to create an effective pivot point about which the spring beam 8 can flex. The position of that pivot point relative to the bolt axis is adjustable, by moving the anchorage point in a direction parallel to the bolt axis (not shown). FIG. 12 is vastly exaggerated in order to show the relationship clearly, but the solid line position of the spring beam 8 is the position for the simulation of a hard joint. The pivot point is at the position shown by the arrow 10. When the anchorage end of the spring beam is moved downwardly towards the bottom plate 13 as shown by the arrows A, the spring beam rocks to the position shown in broken lines and marked 8'; and the pivot point moves to the position marked 10'. This creates a simulation of a soft joint. The movement together or apart of the left-hand ends of the spring beam 8 and work table 13 may be under the control for example of control gearing such as that illustrated in FIG. 6.

FIG. 13 illustrates schematically a variable torque-rate test joint according to the second aspect of the invention, in which there is only one spring beam 8 which has a bifurcated head 8a which extends around just over half of the bolt stem 1. The washer portion 7 of the torque-rate adjustment device of the previous embodiments is not illustrated in FIG. 13, but would be present between the bolt head 4 and the spring beam 8. It will be noted that the diametrically opposite end portions 8b of the bifurcated spring beam 8 are shown lightly shaded. Those shaded portions engage the washer portion of the variable torque-rate test joint to transfer the resistance of the spring beam 8 to bending through the washer to the bolt head 4 symmetrically, avoiding misalignment of the bolt 1 during tightening. In FIG. 11, the pivotal bearing member 10 and reaction point 9 are shown only schematically, but can be as in any previously described embodiment. The means for varying the distance between the pivotal bearing member 10 and the central rotary axis of the bolt 1, to vary the spring constant exerted by the spring beam 8 on the bolt head 4 and thus to vary the effective torque-rate of the test joint, is illustrated schematically by a double headed arrow in FIG. 13. It will be understood however that such means may include a stepper motor and lead screw controlling the linear movement of the pivotal bearing member, and a linear displacement voltage transducer providing closed loop feedback to that stepper motor.

All other optional features of the preceding illustrated embodiments may be included, as appropriate, in the test joint of FIG. 13. For example, there may be cam means for quick release of the anchorage points of the distal ends of the spring beams; the reaction force to bending of the spring beams may be from a work table or from reaction beams; and means may be provided for automatically and rapidly returning the bolt 1 to its start position at the end of each torque application cycle.

FIG. 14 is schematic, as was FIG. 13, and illustrates a variable torque-rate test joint according to the third aspect of the invention. Instead of the single spring beam 8 with the bifurcated end 8a of FIG. 13, FIG. 14 utilises two identical parallel spring beams 8 which extend in parallel from a common reaction point 9 over a pivotal bearing member 10 to engage beneath the washer portion (not illustrated) that lies beneath the bolt head 4. Just as in FIG. 13, the zones 8c of the single spring beam 8 provide a reaction force on the bolt head being tightened that is symmetrical on diametrically opposite sides of the bolt 1, avoiding problems of potential misalignment of the bolt during tightening.

As with FIG. 13, all other optional features of the preceding illustrated embodiments may be included, as appropriate, in the test joint of FIG. 14.

FIG. 15 illustrates, again schematically, an array of five variable torque-rate test joints according to the third aspect of the invention, having a common reaction point 9 and a common pivotal bearing member 10. The pivotal bearing member 10 is accurately guided between accurately constructed slideways 50 at each end of the pivotal bearing member 10, the precision of machining being sufficient to ensure that the pivotal bearing member 10 is always held strictly perpendicular to the longitudinal axes of the spring beams 8. Its lateral movement is preferably controlled by a ball screw actuator 52 driven by a stepper motor under the control of a computer. Each pair of spring beams 8 interacts, through a washer (not shown) with the head of a corresponding bolt 1 as described above with reference to FIG. 14. The five bolts 1 are, however, of different sizes corresponding to a range of sizes of bolts used in manufacturing industry, and the moment of inertia of each bolt therefore corresponds exactly to the moment of inertia of a correspondingly sized bolt as used in such a manufacturing industry. Each bolt size has a corresponding range of torque capacities. For example, the torque capacities of the five bolts illustrated, from bottom to top, could be 5 Nm, 25 Nm, 50 Nm, 180 Nm and 500 Nm. Each beam pair associated with one of the five bolts 1 has a different spring constant, and each beam pair is separately calibrated so that on selection of one out of the five available bolt heads 4, a master computer merely operates the actuator 52 to move the pivotal bearing member 10 to an appropriate base position from which it can be further adjusted to simulate a hard or a soft joint.

As with FIGS. 13 and 14, all other optional features of the preceding illustrated embodiments may be included, as appropriate, in the test joint of FIG. 15.

INDUSTRIAL APPLICABILITY

The variable torque-rate test joint of the invention is suitable for the performance testing of a wide variety of rotary tools, including impulse tools. It is considerably less expensive to manufacture than conventional test joints which utilise frictional or magnetic brakes to provide the necessary increasing resistance to turning as the simulated joint is tightened. Most importantly, the moment of inertia of the rotating parts of the joint of the invention are no more than that of a typical bolt which the rotary tool under test would be used on an assembly line.

The invention claimed is:

1. A variable torque-rate test joint for the performance testing of rotary tools for threaded fasteners, comprising:
   a screw-threaded bolt received in a screw-threaded recess in a test rig, for angular displacement by a rotary tool under test; and
   a torque-rate adjustment device between a head of the bolt and a shoulder adjacent the screw-threaded recess,
   wherein the torque-rate adjustment device comprises:
   a washer portion encircling the bolt beneath the bolt head;
   at least one spring beam extending from a reaction point which is located radially outwardly of the bolt and over a pivot point, to support in cantilever the washer portion; and
   means for varying the distance between the or each pivot point and a central rotary axis of the bolt, to vary the spring constant exerted by the or each spring beam on the bolt head and thus to vary the effective torque-rate of the test joint.

2. A variable torque-rate test joint according to claim 1, wherein two or more spring beams are provided, arranged symmetrically around and directed radially outwardly from the bolt axis, supporting in cantilever the washer portion of the adjustable device; and the means for varying the distances between the associated pivot point and the central rotary axis of the bolt are effective to vary those distances only in unison with one another.

3. A variable torque-rate test joint according to claim 2, wherein there are three such spring beams.

4. A variable torque-rate test joint according to claim 1, wherein a single spring beam is provided, having a bifurcated head which surrounds or partially surrounds the bolt, to support in cantilever along a diameter of the bolt the washer portion of the adjustable device.

5. A variable torque-rate test joint according to claim 1, wherein the torque-rate adjustment device comprises a parallel side by side pair of spring beams which extend tangentially from beneath the bolt head, over aligned pivot points, and to aligned reaction points.

6. A variable torque-rate test joint according to claim 5, comprising a number of different sized screw-threaded bolts each received in a corresponding screw-threaded recess in the test rig, and a corresponding number of torque-rate adjustment devices between the heads of the respective bolts and shoulders adjacent the screw-threaded, and one pair of spring beams for each bolt and bolt-head, with a common member providing the reaction points of the respective pairs of spring beams and one pivot member providing the pivot point for all of the pairs of spring beams, the pivot member being guided so as to be capable of movement only in a direction parallel to the common longitudinal axes of the pairs of spring beams.

7. A variable torque-rate test joint according to claim 6, wherein the reaction point of the or each spring beam is an anchorage to a work table of the test rig, the screw-threaded recess being formed in the same work table.

8. A variable torque-rate test joint according to claim 6, wherein the reaction point of the or each spring beam is an anchorage to a reaction beam extending generally parallel to the respective spring beam.

9. A variable torque-rate test joint according to claim 8, wherein the or each reaction beam is a spring reaction beam.

10. A variable torque-rate test joint according to claim 1, further comprising means for rapidly releasing the torque imparted to the screw threaded bolt, at the end of each torque tightening cycle of a performance test.

11. A variable torque-rate test joint according to claim 10, wherein the means for rapidly releasing the torque comprises means for axially moving the shoulder relative to the bolt head, temporarily to release the compression applied to the torque-rate adjustment device at the end of each torque tightening cycle of a performance test.

12. A variable torque-rate test joint according to claim 10, wherein the means for rapidly releasing the torque comprises means for axially moving the reaction point of the or each spring beam, temporarily to release the compression applied to the washer portion by the bolt head at the end of each torque tightening cycle of a performance test.

13. A variable torque-rate test joint according to claim 10, wherein the means for rapidly releasing the torque comprises a single cam member, movement of which to a pressure releasing position causes axial movement of the or each reaction point.

14. A variable torque-rate test joint according to claim 10, further comprising means for mechanically running the threaded bolt back to a start position for a subsequent torque tightening cycle of a performance test, while the torque imparted to the threaded bolt is released at the end of each cycle.

15. A variable torque-rate test joint according to claim 14, wherein the means for mechanically running the threaded bolt back to its start position comprises a lightweight torque spring.

16. A variable torque-rate test joint according to claim 14, wherein the means for mechanically running the threaded bolt back to its start position comprises an electric motor driving a rotary spindle engageable with an end of the threaded bolt remote from the bolt head, to engage and turn the threaded bolt at the end of each cycle while the torque imparted to the bolt during the cycle is released.

17. A variable torque-rate test joint according to claim 1, wherein the or each pivot point is provided by a pivotal bearing member between the associated spring beam and the test rig.

18. A variable torque-rate test joint according to claim 17, wherein the or each pivotal bearing member presents a curved face to its associated spring beam, over which the spring beam can flex.

19. A variable torque-rate test joint according to claim 18, wherein the curvature of the curved face is from 0.32 to 2.4 degrees of arc.

20. A variable torque-rate test joint according to claim 1, wherein the or each pivot point is provided by contact between a convex portion of the spring beam and the test rig, and the means for varying the distance between the or each pivot point and the central rotary axis of the bolt comprises means for moving the reaction point of that spring beam in a direction parallel to the axis of the bolt.

21. A variable torque-rate test joint according to claim 1, wherein the means for varying the distance between the or each pivot point and the bolt axis comprises screw means.

22. A variable torque-rate test joint according to claim 1, wherein the means for varying the distance between the or each pivot point and the bolt axis comprises cam means.

23. A variable torque-rate test joint according to claim 1, further comprising stop means between an end portion of the or each spring beam closest to the bolt and the shoulder, or between the washer portion of the torque-rate adjustment device and the shoulder, to limit the permitted flexure of the associated spring beam.

* * * * *

UNITED STATES PATENT AND TRADEMARK OFFICE
CERTIFICATE OF CORRECTION

PATENT NO. : 8,418,569 B2  
APPLICATION NO. : 12/449570  
DATED : April 16, 2013  
INVENTOR(S) : Peter William Everitt et al.

Page 1 of 1

It is certified that error appears in the above-identified patent and that said Letters Patent is hereby corrected as shown below:

In the Claims

In column 13, line 2 (line 6 of Claim 6) the word "recesses" was omitted. Please replace the issued Claim 6 with the following claim:

6. A variable torque-rate test joint according to claim 5, comprising a number of different sized screw-threaded bolts each received in a corresponding screw-threaded recess in the test rig, and a corresponding number of torque-rate adjustment devices between the heads of the respective bolts and shoulders adjacent the screw-threaded -- recesses --, and one pair of spring beams for each bolt and bolt-head, with a common member providing the reaction points of the respective pairs of spring beams and one pivot member providing the pivot point for all of the pairs of spring beams, the pivot member being guided so as to be capable of movement only in a direction parallel to the common longitudinal axes of the pairs of spring beams.

Signed and Sealed this  
Twenty-first Day of May, 2013

Teresa Stanek Rea  
*Acting Director of the United States Patent and Trademark Office*